Dec. 5, 1961 M. SHUTT 3,011,660
PARKING AND HANDLING DEVICES
Filed Aug. 31, 1955 6 Sheets-Sheet 1

Fig.1.

INVENTOR
Milo Shutt

Dec. 5, 1961 M. SHUTT 3,011,660
PARKING AND HANDLING DEVICES
Filed Aug. 31, 1955 6 Sheets-Sheet 2

Fig. 2.

INVENTOR
Milo Shutt

Dec. 5, 1961  M. SHUTT  3,011,660
PARKING AND HANDLING DEVICES
Filed Aug. 31, 1955  6 Sheets-Sheet 4

INVENTOR
Milo Shutt

Dec. 5, 1961 M. SHUTT 3,011,660
PARKING AND HANDLING DEVICES
Filed Aug. 31, 1955 6 Sheets-Sheet 6

INVENTOR
Milo Shutt

A United States Patent Office 3,011,660
Patented Dec. 5, 1961

3,011,660
PARKING AND HANDLING DEVICES
Milo Shutt, Alliance, Ohio, assignor to Union Industrial Co., Division of The Alliance Machine Co., Alliance, Ohio, a corporation of Ohio
Filed Aug. 31, 1955, Ser. No. 531,655
8 Claims. (Cl. 214—16.1)

The present invention relates to parking and handling devices and particularly to an automatic parking and handling apparatus for automotive vehicles. The problem of parking and discharging automotive vehicles in off street parking areas has become increasingly important with the growth of suburban living and the use of the motor vehicle for commuting. The vast majority of the parking areas created heretofore have been based upon the principle of driving the vehicle under its own power into and out of the storage space. This is true even where tiered structures are used in which an elevator raises the vehicle from the entrance level. Various types of charging and discharging devices for use in tiered storage structures have been proposed to eliminate the need for driving the vehicle under its own power into the storage space. In most cases, they have proven unsatisfactory because of the complexity of both the drive mechanism and the charging apparatus itself. In the present invention, I provide a parking and handling device which is simple in operation and construction and overcomes the difficulties which are inherent in the parking systems heretofore used.

I provide a parking apparatus including a multilevel structure with generally side by side storage stalls at each level, elevator means traversable transversely of the ends of the stall, cooperating ways on the elevator means and on each stall, a carriage on the elevator movable on said cooperating ways into each stall, horizontally movable wheel engaging means on the carriage selectively engageable beneath each wheel of a pair of vehicle wheels to be raised and means for vertically raising said wheel engaging means to lift the vehicle wheels from the elevator means. Preferably, the horizontally movable wheel engaging means are paired horizontally movable members pivoted on each side of the carriage adjacent one end and movable in an arc from a position generally parallel to the side of the carriage to a position transverse to the sides of the carriage whereby to engage opposite sides of each wheel of a pair of vehicle wheels to be raised at a point below the plane of the wheel axes. Preferably, these horizontally movable members are mounted on the ends of bell cranks which are actuated by screws driven by hydraulic pistons. Preferably, the carriage is mounted on trucks at opposite ends of the carriage, each truck preferably being made up of multiple pairs of vehicle wheels on spaced parallel axes. Preferably, the wheels carrying the vehicle wheel engaging means are mounted so as to raise the carriage when the wheel engaging means are positioned on opposite sides of the vehicle wheel. Preferably, this is accomplished by mounting paired axles on bell cranks pivoted to the carriage and actuated at the end opposite the axle by a hydraulic cylinder acting to raise or lower the wheels on the end of the bell crank so as to raise the end of the carriage. The carriage wheels preferably run guideways such as angles or channels on the elevator which cooperate with corresponding angles or channels in the storage stalls. Preferably, the carriage is driven hydraulically by separate hydraulic motors at each side of the carriage, which motors are driven from a hydraulic pump and an electric motor on the carriage.

In the foregoing statement, certain advantages, objects and purposes of the present invention are set forth. Other purposes, object and advantages will be apparent, however, from a consideration of the following description and the accompanying drawings in which.

Figure 1:
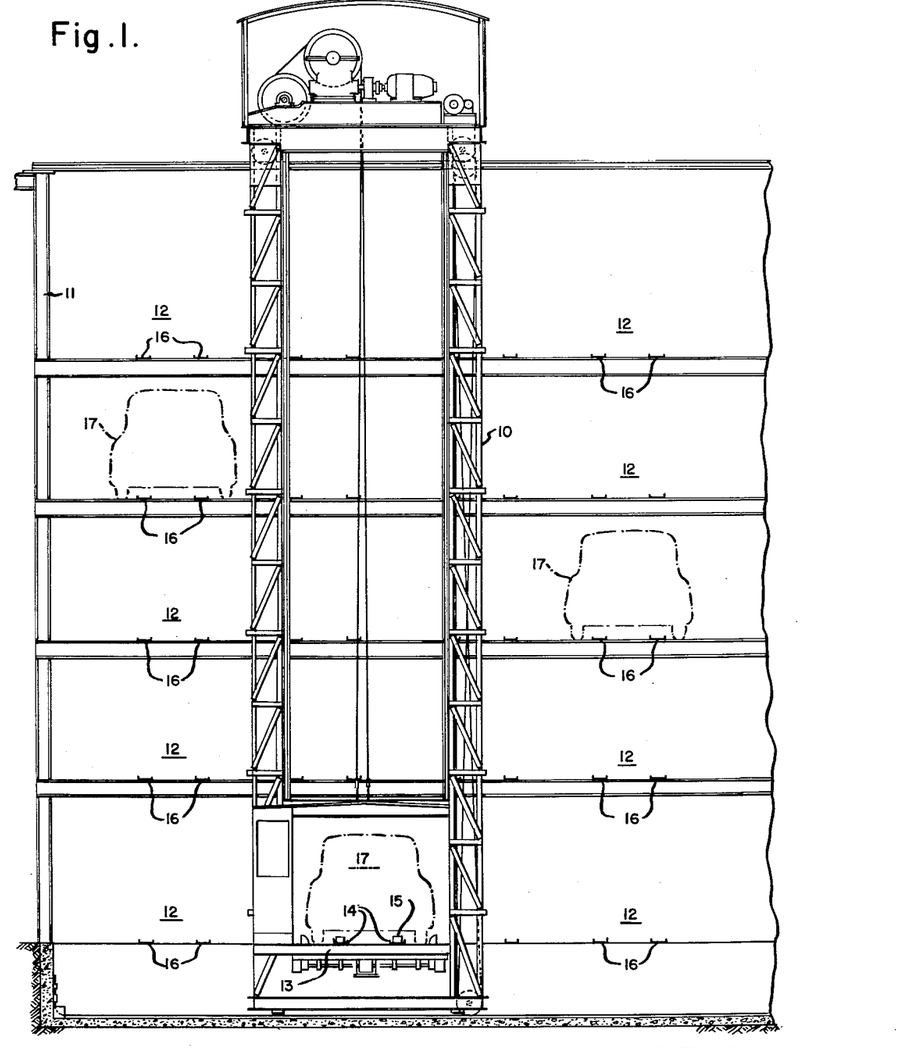
FIGURE 1 is an end elevation of an elevator tower and tiered storage structure incorporating the subject matter of the present invention.

Referring to the drawings there is illustrated diagrammatically in FIGURE 1 an elevator tower 10 movable transversely of a tiered multi-storied structure 11 with separate storage stalls 12 opening to the elevator. The elevator tower 10 is provided with a vertically moving platform 13 of conventional design which may be operated vertically by any of conventional methods. All of the foregoing may follow well known and conventional structures.

The platform 13 is provided with cooperating guideways 14 carrying a carriage 15. Each stall 12 is provided with cooperating guideways 16 which align with the guideways 14 on the elevator when the platform is brought in front of the stall 12 for the placement of an automotive vehicle 17 therein.

The carriage 15 is made up of a central member 20 having spaced, generally parallel side frames 20a and cross members 20b. A lifting platform 21 is placed over the central member 20 and is vertically movable with respect thereto by means which will hereafter be described. Spaced parallel flanges 22 and 23 depend from each side of the platform 21 outside of the side frames 20a. Four sets of trucks 24 are pivotally mounted on shafts 25 extending from the side frames 20a adjacent each corner of the platform 21. Each truck 24 is provided with wheels 26 rotatably mounted therein, preferably in pairs, one on each side of the shaft 25. Each shaft 25 is also mounted in a yoke 27 mounted on and form a pair of one end of bell cranks 28. Each of the bell cranks 28 is pivoted on a shaft 29 between the depending flanges 22 and 23. The end of each bell crank opposite the yoke is connected to a link 30. Each side of the platform 21 is provided with two such assemblies of yokes 27 and bell cranks 28 spaced from one another and adjacent the four corners. A hydraulic cylinder 31 is mounted centrally of the platform 21 and is provided with a piston 32 movable in the cylinder. The piston 32 carries a head 33 having a guide rod 34 moving in a hollow guide member 35 fixed to the frame of the truck to maintain the cylinder and piston in alignment. Lift arms 36 are pivoted intermediate their ends on the platform of the truck and are connected by a link 37 at one end to the piston head 33. The links 30 on the two bell cranks on each side of platform 21 are pivoted on the lift arms 36 on opposite sides of their pivot on the platform 21 of the truck. Movement of the piston 32 out of the cylinder 31 causes the lift arms 36 to rotate about their pivot. The links 30 move in opposite directions to pivot the bell cranks about their pivotal points thereby raising the platform 21 vertically away from the frame 20.

Figure 2:
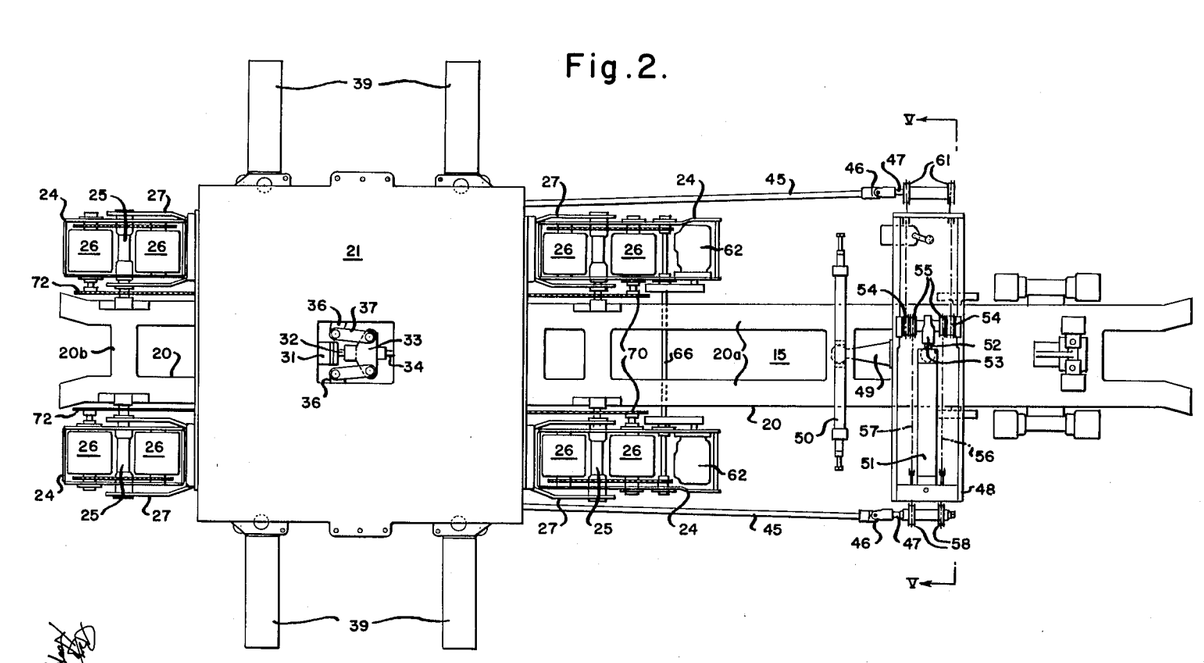
FIGURE 2 is an enlarged plan view of a preferred embodiment of a carriage according to this invention.
Figure 3:
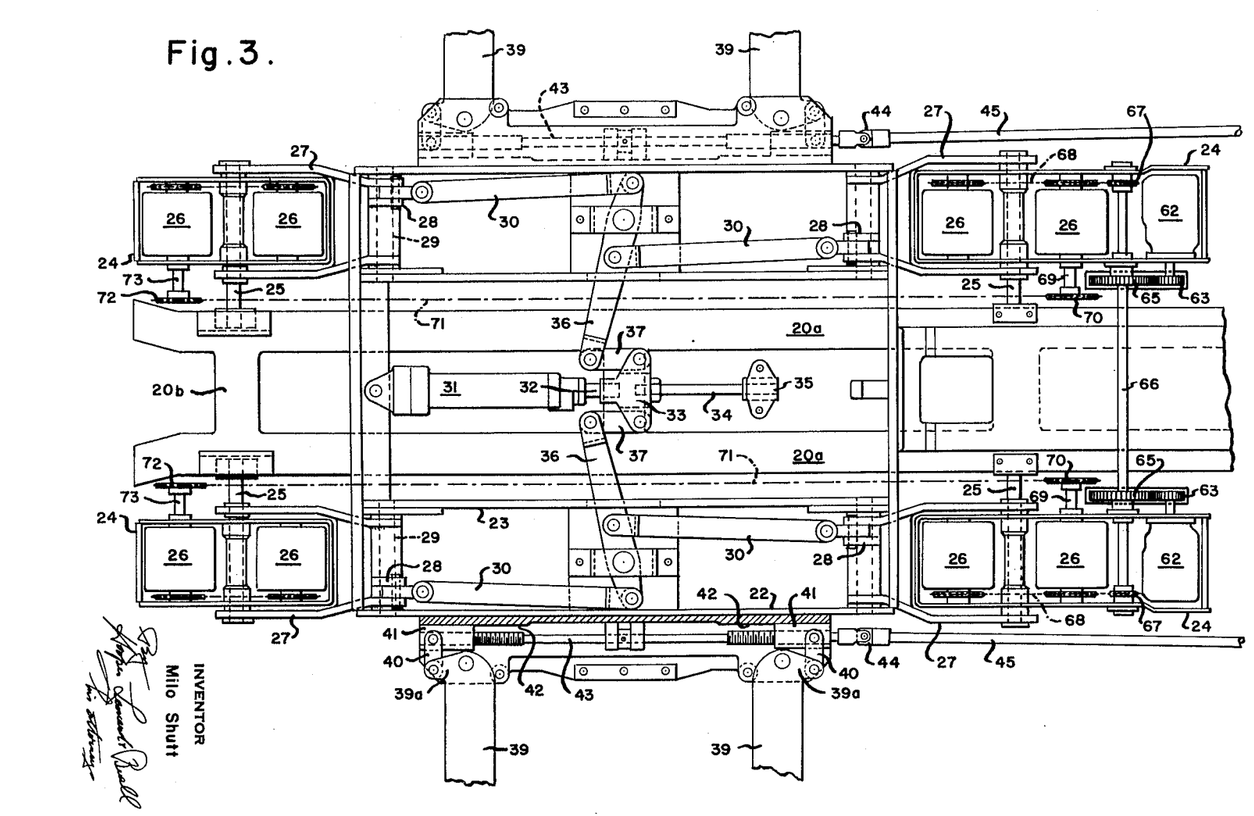
FIGURE 3 is an enlarged plan view of a segment of the lifting mechanism of the embodiment shown in FIGURE 2.
Figure 4:
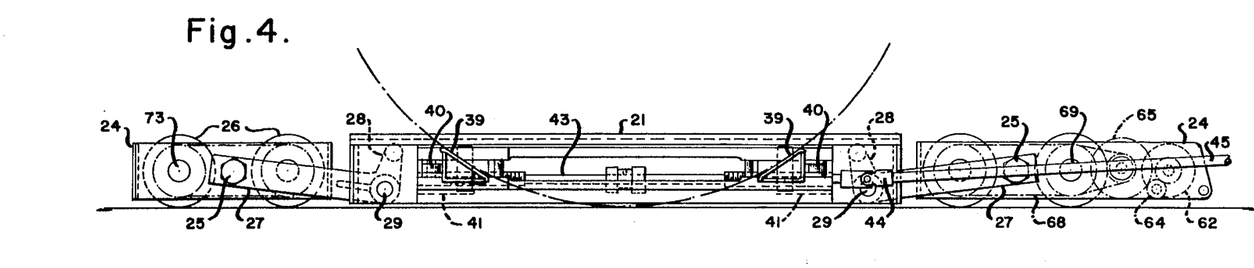
FIGURE 4 is a side elevation of the lifting mechanism shown in FIGURE 3.
Figure 5:
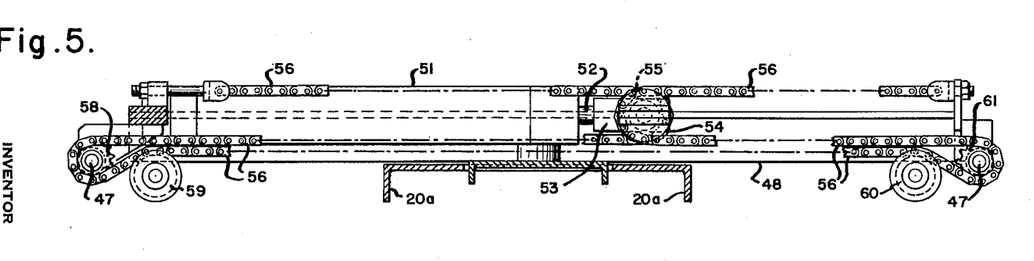
FIGURE 5 is a section on the line V—V of FIGURE 2.
Figure 6:
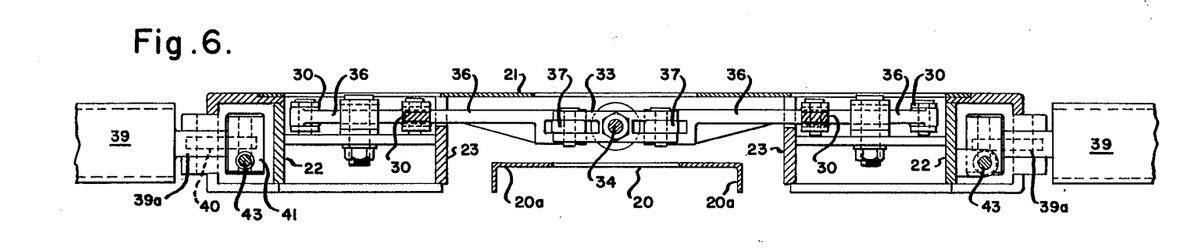
FIGURE 6 is a section along the line VI—VI of FIGURE 3.

A pair of spaced elongated lifting arms 39 are pivoted on flanges 22 on each side of the platform 21 between the pairs of tandem wheels. Each of the lifting members is triangular in section and is adapted to engage the circumference of a vehicle wheel below the plane of its axis. The arms 39 form one end of bell cranks 39a, the opposite end of which are connected to links 40, which are in turn connected to slide bars 41 moving in guideways 42 on the flange 22 of the platform 21. Each such slide bar is threaded on a shaft 43 parallel to flange 22. This arrangement of bell cranks and slide bar links is self-locking by reason of the position of links 40 generally parallel to the lift arms 39 when the arms 39 are moved to lifting position.

The shafts 43 are driven by drive shafts through universal joints 44 and drive shafts 45 which extend generally parallel to the side frames 20a. The drive shafts 45 are connected through universal joints 46 to power shafts 47 mounted on a transverse frame 48 extending across the center member 20. The transverse frame 48 is slidably and pivotally mounted between side frames 20a and is provided with an equalizer bar 49 extending generally parallel to the side frames 20a. A spring loaded torsion member 50 engages the end of the equalizer bar 49 to yieldably maintain the frame 48 centered on the side frames 20a. A hydraulic cylinder 51 is mounted on the transverse frame 48 and is provided with a piston 52 movable longitudinally of the frame 48. A crosshead 53 is mounted on the piston 52 and is slidable on the frame 48. The crosshead 53 is provided with a pair of sprockets 54 and 55 on each side of the crosshead. A pair of generally parallel chains 56 and 57 are dead-ended at one end of the frame 48 adjacent the piston 51. Each chain passes over a sprocket 55 on each side of the crosshead, then around a drive sprocket 58 on one of the power shafts 47, over an idler pulley 59 along the bottom of frame 48 to an idler 60 on the opposite end of the frame 48, thence around a sprocket 61 on the other power shaft 47, over the sprocket 54 on the crosshead and dead-ends on the opposite end of the transverse frame 48. Movement of the piston 52 causes the chain to move about the sprockets 58 and 61 to drive the power shaft 47 for rotation.

The carriage may be driven along the ways 14 and 16 by means of hydraulic motors 62 mounted in the rear trucks 24. Each motor 62 drives a gear 63 which engages a gear 64 to drive a gear 65 on a common shaft 66. The shaft 66 is provided with sprockets 67 which drive the wheels 26 of the trucks 24 by means of chain drive 68. One of the rear wheels 26 on each side of the center member is provided with an extended shaft 69 carrying a sprocket 70. The sprocket 70 drives a chain 71 which extends to the forward set of trucks where it drives wheel 26 through a sprocket 72 and shaft 73.

In parking an automobile by means of the present invention, an automobile is driven into a receiving stall, the carriage is run off the platform 13 beneath the automobile on wheels 26. The piston 52 is actuated to drive the power shafts 47 by means of chains 56 and 57 thereby rotating the drive shafts 45. The slide bars 41 move in guideways 42 forcing the bell cranks 39a about their pivot point. When the arms 39 are transverse to the center member 20, the links 40 lock the lift arms 39 against movement. The piston 32 is energized and the bell cranks 28 are pivoted by the linkage described above to raise the platform 21 vertically from the center member 20 and to bring the lifting arms 39 into contact with the tires of the vehicle to be parked and raise the wheel from the stall floor. The drive motors 62 are energized to return the carriage to the elevator platform 14. The elevator is moved to the proper storage stall, the drive motors 62 are used to move the carriage into the storage stall. The piston 32 is de-energized, bell cranks 28 are pivoted to lower the platform 21 and arms 39 are lowered out of contact with the vehicle wheels. The piston 52 is de-energized to return the lift arms to the sides of the platform 21 and the carriage is returned to the elevator ready for another vehicle.

Figure 7:
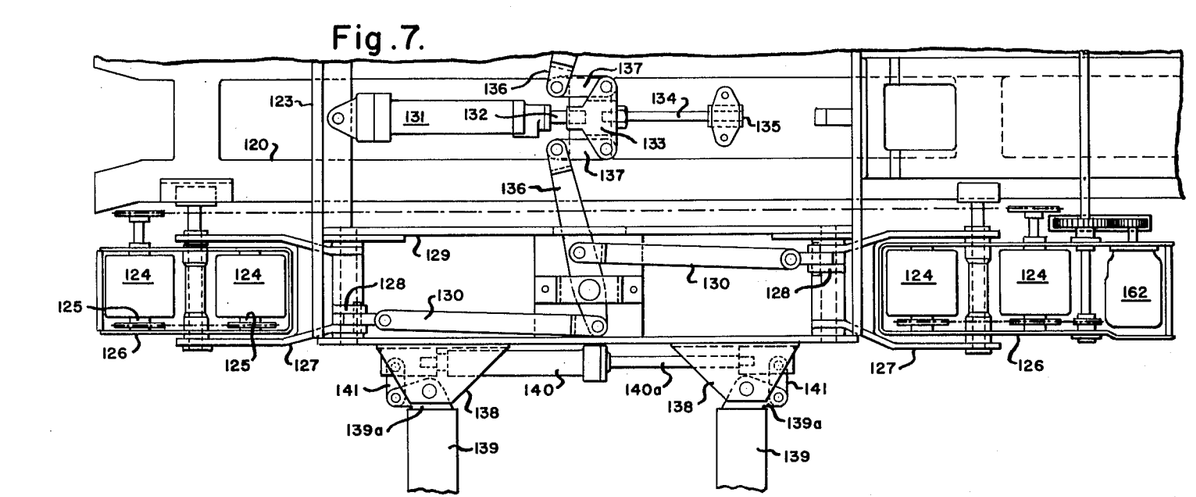
FIGURE 7 is a partial top plan view of a segment of the lifting mechanism of a second embodiment of a carriage according to this invention.
Figure 8:
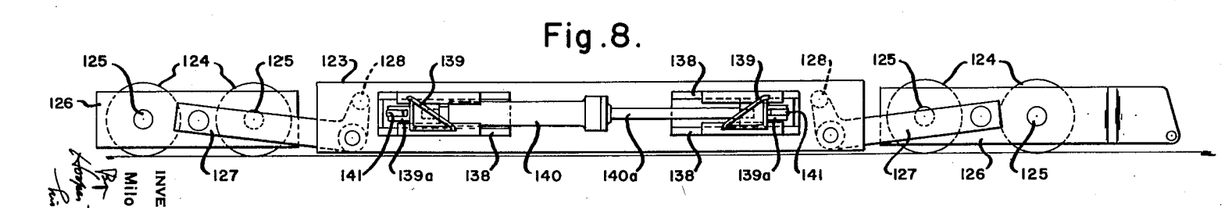
FIGURE 8 is a side elevation of the lifting mechanism of the embodiment shown in FIGURE 7.

In the embodiment illustrated in FIGURES 7 and 8, I have shown one half of a symmetrical carriage consisting of an elongated central member 120 mounted on a rear truck having rubber wheels adapted to run in the guideways 14 and 16. This arrangement is generally the same as that shown in FIGURES 2 through 6. A front end lifting truck 123 is provided at the opposite end of the central member 120. The front truck is provided with four pairs of wheels 124, each wheel on a separate axle 125 and each pair of wheels being in tandem and mounted in side frames 126 which are pivoted in yokes 127 mounted on and forming a part of one end of bell cranks 128. Each of the bell cranks is pivoted on the frame 129 of the truck 123. The end of each bell crank opposite the yoke is connected to a link 130. Each side of the truck is provided with two such assemblies of yokes 127 and bell cranks 128 spaced from one another on the same line as shown in FIGURES 2 and 3. A hydraulic cylinder 131 is mounted centrally of the front truck and is provided with a piston 132 movable in the cylinder. The piston 132 carries a head 133 having a guide rod 134 moving in a hollow guide member 135 fixed to the frame of the truck to maintain the cylinder and piston in alignment. Lift arms 136 are pivoted intermediate their ends on the frame of the truck and are connected by a link 137 at one end to the piston head 133. The links 130 on the bell cranks are pivoted on the lift arms 136 on opposite sides of their pivot on the frame of the truck. Movement of the piston 132 out of the cylinder 131 causes the lift arms 136 to rotate about their pivot. The links 130 move in opposite directions to pivot the bell cranks about their pivotal points thereby raising the truck vertically away from the elevator platform.

A pair of spaced elongated lifting arms 139 are pivoted on flanges 138 extending from each side of the frame between the pairs of tandem wheels. Each of the lifting members is triangular in section and is adapted to engage the circumference of a vehicle wheel below the plane of its axis. The arms 139 form one end of bell cranks 139a, the opposite ends of which are connected to the ends of a hydraulic cylinder 140 and piston 140a respectively by links 141. Extension of the cylinder moves the members 139 to a position transverse to the side of the truck frame and in lifting position. Contraction of the cylinder moves the members 139 into retracted position along the sides of the frame.

Figures 9, 10:
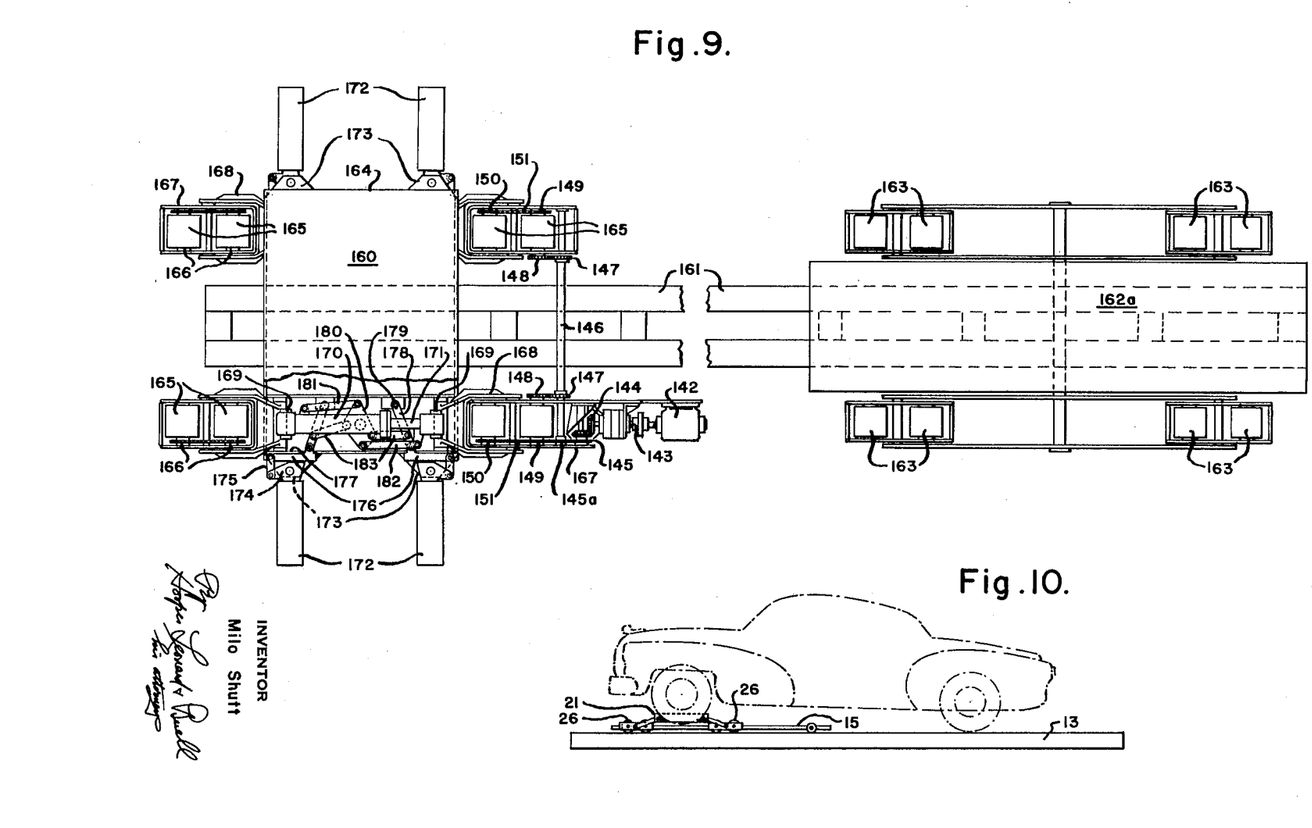
FIGURE 9 is a top plan view of a third embodiment of a carriage according to this invention.
FIGURE 10 is a side elevation of an elevator platform and carriage according to this invention with an automotive vehicle diagrammatically shown thereon.

The carriage may be driven along the ways 14 and 16 by the same arrangement shown in FIGURES 2 through 5 or by means of the system illustrated in FIGURE 9 and hereafter described.

In parking an automobile by means of the present invention, the automobile is driven into a receiving stall and the carriage is run off the elevator (see FIGURE 1)

and beneath the vehicle with the vehicle astride the center member 120. The platform is raised to the proper level and positioned in front of the stall which is to receive the vehicle. The hydraulic cylinder 140 and piston 140a are extended to bring the lifting arms 139 transversely outwardly from the sides of the frame on opposite sides of the front wheels of the vehicle. The piston 132 is energized and the wheels 124 are carried downwardly by the bell cranks 128 raising the lifting arms 139 against the vehicle wheel and raising the wheel from the elevator platform. The drive motor 162 is energized and the carriage moves along the cooperating guideways into the stall 12 whereupon the piston 132 is de-energized, the wheels retract toward the truck frame and the lifting arms are retracted away from the wheels. The carriage then returns to the elevator platform to receive another vehicle.

In the embodiment illustrated in FIGURE 9, I have shown an alternative form of carriage 160 having an elongated center member 161 identical with the member 20 of the embodiment of FIGURES 2 through 6. A rear truck 162a carries one end of the center member 161. The rear truck has rubber wheels 163 mounted on paired tandem axles at opposite ends thereof and adapted to run in the guideways 14 and 16.

A front end lifting truck 164 is provided at the opposite end of the center member 161. As in the case of the front truck of the embodiment shown in FIGURES 2 through 8, four pairs of wheels 165 are provided, each wheel on a separate axle 166 and each pair of wheels being in tandem and mounted in side frames 167 which are pivoted in yokes 168 mounted on and forming a part of one end of bell cranks 169. Each of the bell cranks is pivoted on the frame of the truck. In the embodiment of FIGURE 9 a hydraulic cylinder 170 on each side of the truck is attached to the end of one bell crank 169 opposite the yoke 168. A piston 171 operated by the cylinder 170 is connected to the other bell crank 169 on the same side of the truck. Expansion of the piston 171 out of the cylinder 170 causes the yoke 168 to move toward the elevator platform thereby raising the frame of the truck away from the platform.

Each side of the truck is provided with a pair of elongated lifting arms 172 pivoted on flanges 173 extending from each side of the frame between the pairs of tandem wheels. Each lifting arm is triangular in section and is adapted to engage the circumference of a vehicle wheel below the plane of its axis. The arms 172 form one end of bell crank 174, the opposite ends of which are connected to links 175, in turn connected to slide bars 176 moving in guideways 177 in the sides of the truck frame. Each slide bar is pivotally connected to one end of a link 178. The opposite end of the link is pivoted in an elongated hole 179 in the frame of the truck. As in the case of the embodiment shown in FIGURES 2 through 4 the slide bars are self-locking.

A quadrangular cam plate 180 is pivoted on the frame of the truck midway between the bell cranks 169. A drive link 181 is connected at one end to one corner of the cam plate and at the other end to the cylinder 170. A second drive link 182 is connected at one end to the hydraulic piston 171 and at the other end to the corner of the cam plate diagonally across the plate from its connection with link 181. Links 183 connect the other corners of the cam plate with the links 178. A motor 142 mounted on the side frame 167 and driving a shaft 143 which extends parallel to the direction of travel. The shaft 143 drives a set of miter gears 144 mounted between the side frames 167 of one pair of tandem wheels on the front truck. A gear 145 is driven by the miter gears 144 and in turn drives a gear 145a keyed to a transverse shaft 146 extending through the side frames 167 of two sets of wheels. Gears 147 are mounted on the shaft 146 externally of each set of side frames 167 and are in driving engagement with a gear 148 on the axle of one wheel of each pair of tandem wheels. A sprocket 149 is mounted on the same axle and drives a second sprocket 150 on the axle of the other wheel forming the tandem pair through a chain 151.

The operation of the carriage of FIGURE 9 is generally as follows. A vehicle is driven into a receiving stall and the carriage is run off the elevator platform beneath the automobile with the automobile astride the center member 161 with its front wheels at the front truck 164. The cylinder 170 and piston 171 are moved apart. This causes the links 181 and 182 to rotate the cam plate 180 and to move the links 183 to the right and left viewing FIGURE 9. Movement of links 183 causes links 178 to rotate about their pivots 179 moving the slide bars 176 in guideways 177 thereby rotating the bell cranks 174 about their pivots on the flanges and bringing the lifting arms 172 from a position alongside the truck to a position transverse to the truck and on opposite sides of the vehicle wheel to be lifted. Immediately upon the rotation of cam plate 180 the cylinder 170 and piston 171 act on bell cranks 169 to raise the truck 164 and thereby the lifting arms 172 and the vehicle wheel in contact with them.

The carriage structure of the present invention has the advantage of simplicity of structure and ease of operation. In addition, it automatically aligns a vehicle being placed in the storage stall by permitting the rear wheels to move and track the front truck as the vehicle is placed in the stall, and perhaps most important, it does not come into contact with any part of the underside of the vehicle.

While I have illustrated and described certain preferred embodiments of my invention, it will be understood that it may be otherwise embodied within the scope of the following claims.

I claim:

1. In a parking apparatus, a multi-level structure having generally side by side storage stalls at each level having a surface adapted to receive the wheels of a vehicle to be parked, elevator means traversable transversely of the ends of the stalls, cooperating ways on the elevator means and in each stall, a carriage on said elevator means movable on said cooperating ways into each stall, horizontally movable wheel engaging means on said carriage movable above and generally parallel to the surface of the stalls from a position generally parallel to the side of the carriage to a position transverse to the side of the carriage and selectively engageable beneath the opposite sides of each wheel of a pair of vehicle wheels to be raised, wheel means on the carriage on opposite sides of said wheel engaging means and drive means moving the axis of the wheel means away from the wheel engaging means whereby to raise the wheel engaging means from the cooperating ways after the wheel engaging means have engaged the wheels.

2. In a parking apparatus, a multi-level structure having generally side by side storage stalls at each level having a surface adapted to receive the wheels of a vehicle to be parked, elevator means traversable transversely of the ends of the stall, cooperating ways on the elevator means and in each stall, a carriage on said elevator means movable on said cooperating ways into each stall, a pair of horizontally movable members pivoted on each side of the carriage adjacent one end and movable in an arc from a position generally parallel to the side of the carriage to a position transverse to the sides of the carriage whereby to engage opposite sides of each wheel of a pair of vehicle wheels to be raised, means for selectively positioning said horizontally movable members, wheel means on the carriage on opposite sides of said wheel engaging means and drive means moving the axis of the wheel means away from the wheel engaging means whereby to raise the wheel engaging means from the cooperating ways after the wheel engaging means have engaged the wheels.

3. In a parking apparatus, a multi-level structure having generally side by side storage stalls at each level, elevator means traversable transversely of the ends of the stalls, cooperating ways on the elevator means and in each stall, a carriage on said elevator means movable on said cooperating ways into each stall, a pair of horizontally movable members each forming one arm of a bell crank pivoted on each side of the carriage adjacent one end and movable in an arc from a position generally parallel to the side of the carriage to a position transverse to the sides of the carriage whereby to engage opposite sides of each wheel of a pair of wheels to be raised, a hydraulic cylinder operatively connected to the opposite arms of said bell cranks to control the movement of the horizontally movable members, wheel means on the carriage on opposite sides of said wheel engaging means and drive means moving the axis of the wheel means away from the wheel engaging means whereby to raise the wheel engaging means from the cooperating ways.

4. In a parking apparatus, a multi-level structure having generally side by side storage stalls at each level having a surface adapted to receive the wheels of a vehicle to be parked, elevator means traversable transversely of the ends of the stalls, cooperating ways on the elevator means and in each stall, a carriage on said elevator means movable on said cooperating ways into each stall, a pair of horizontally movable members each forming one arm of a bell crank pivoted on each side of the carriage adjacent one end and movable in the arc above and generally parallel to the surface of the stalls from a position generally parallel to the side of the carriage to a position transverse to the sides of the carriage whereby to engage opposite sides of each wheel of a pair of wheels to be raised, a slide bar slidable in ways on the carriage adjacent each horizontally movable member, connections between each slide bar and the adjacent bell crank on the horizontally movable member, screw means threadingly engaging each slide bar for moving it in the ways whereby to pivot the bell cranks, means on the carriage reversibly rotating said screw means, wheel means on the carriage on opposite sides of said horizontally movable members, and drive means moving the axis of the wheel means away from the horizontally movable members whereby to raise the horizontally movable members from the cooperating ways.

5. In a parking apparatus, a multi-level structure having generally side by side storage stalls at each level, elevator means traversable transversely of the ends of the stalls, cooperating ways on the elevator means and in each stall, a carriage on said elevator means movable on said cooperating ways into each stall, a pair of horizontally movable members each forming one arm of a bell crank pivoted on each side of the carriage adjacent one end and movable in an arc from a position generally parallel to the side of the carriage to a position transverse to the sides of the carriage whereby to engage opposite sides of each wheel of a pair of wheels to be raised, a slide bar slidable in ways on the carriage adjacent each horizontally movable member, connections between each slide bar and the adjacent bell crank on the horizontally movable member, screw means threadingly engaging each slide bar for moving it in the ways whereby to pivote the bell cranks, a drive shaft connected to said screw means, sprocket means on the drive shaft, a chain rotatable about said sprocket to rotate the drive shaft, hydraulic means carrying the chain reversibly about the sprocket, wheel means on the carriage on opposite sides of said horizontally movable members, and drive means moving the axis of the wheel means away from the horizontally movable members whereby to raise the horizontally movable members from the cooperating ways.

6. In a parking apparatus, a multi-level structure having generally side by side storage stalls at each level, elevator means traversable transversely of the ends of the stalls, cooperating ways on the elevator means and in each stall, a carriage on said elevator means movable on said cooperating ways into each stall, a pair of horizontally movable members each forming one arm of a bell crank pivoted on each side of the carriage adjacent one end and movable in an arc from a position generally parallel to the side of the carriage to a position transverse to the sides of the carriage whereby to engage opposite sides of each wheel of a pair of wheel to be raised, a slide bar slidable in ways on the carriage adjacent each horizontally movable member, connections between each slide bar and the adjacent bell crank on the horizontally movable member, screw means threadingly engaging each slide bar for moving it in the ways whereby to pivot the bell cranks, means on the carriage reversibly rotating said screw means, a pair of spaced bell cranks on each side of said carriage, one adjacent each side of the horizontally movable members, yoke means on each of said bell cranks, wheel means in said yokes supporting the carriage, hydraulic piston means on the carriage, and connections between the bell cranks and the hydraulic piston means changing the relative position of the bell cranks and wheels with respect to the horizontally movable members as the piston is actuated.

7. In a parking apparatus, a multi-level structure having generally side by side storage stalls at each level, elevator means traversable transversely of the ends of the stalls, cooperating ways on the elevator means and in each stall, a carriage on said elevator means movable on said cooperating ways into each stall, a pair of horizontally movable members each forming one arm of a bell crank pivoted on each side of the carriage adjacent one end and movable in an arc from a position generally parallel to the side of the carriage to a position transverse to the sides of the carriage whereby to engage opposite sides of each wheel of a pair of wheels to be raised, a slide bar slidable in ways on the carriage adjacent each horizontally movable member, connections between each slide bar and the adjacent bell crank on the horizontally movable member, screw means threadingly engaging each slide bar for moving it in the ways whereby to pivot the bell cranks, a drive shaft connected to said screw means, sprocket means on the drive shaft, a chain rotatable about said sprocket to rotate the drive shaft, hydraulic means carrying the chain reversibly about the sprocket, a pair of spaced bell cranks on each side of said carriage, one adjacent each side of the horizontally movable members, yoke means on each of said bell cranks, wheel means in said yokes supporting the carriage, hydraulic piston means on the carriage, and connections between the bell cranks and the hydraulic piston means changing the relative position of the bell cranks and wheels with respect to the horizontally movable members as the piston is actuated.

8. In a parking apparatus, a multi-level structure having generally side by side storage stalls at each level, elevator means traversable transversely of the ends of the stalls, cooperating ways on the elevator means and in each stall, a carriage on said elevator means movable on said cooperating ways into each stall, a pair of horizontally movable members each forming one arm of a bell crank pivoted on each side of the carriage adjacent one end and movable in an arc from a position generally parallel to the side of the carriage to a position transverse to the sides of the carriage whereby to engage opposite sides of each wheel of a pair of wheels to be raised, a slide bar slidable in ways on the carriage adjacent each horizontally movable member, connections between each slide bar and the adjacent bell crank on the horizontally movable member, rotary cam means on the carriage, a hydraulic piston on the carriage rotating said cam means, connections between the cam means and the slide bars whereby all the slide bars are moved in unison between a position with the horizontal movable members generally parallel to the sides of the carriage to a position generally transverse to the sides of the carriage, wheel means on the carriage on opposite sides of the horizontally movable members, and connections between the wheel means and piston means moving the axis of the wheel means away from the horizontally movable members whereby to raise the horizontally movable members with respect to the cooperating ways when the cam means has moved the slide bars to carry the horizontally movable members to a position transverse to the carriage.

References Cited in the file of this patent

UNITED STATES PATENTS

| | | |
|---|---|---|
| 1,817,220 | Young | Aug. 4, 1931 |
| 1,962,127 | Balkema et al. | June 12, 1934 |
| 1,964,119 | Hendry | June 26, 1934 |
| 1,988,619 | Buettell | Jan. 22, 1935 |
| 2,712,869 | Belt | July 12, 1955 |
| 2,801,011 | Overlach et al. | July 30, 1957 |

FOREIGN PATENTS

| | | |
|---|---|---|
| 337,726 | Great Britain | Oct. 28, 1930 |
| 417,366 | Great Britain | Oct. 3, 1934 |
| 728,493 | Germany | Nov. 27, 1942 |

UNITED STATES PATENT OFFICE
CERTIFICATE OF CORRECTION

Patent No. 3,011,660 December 5, 1961

Milo Shutt

It is hereby certified that error appears in the above numbered patent requiring correction and that the said Letters Patent should read as corrected below.

Column 2, line 62, for "pair" read -- part --; column 7, line 28, for "the" read -- an --; column 8, line 7, for "wheel" second occurrence, read -- wheels --.

Signed and sealed this 12th day of June 1962.

(SEAL)
Attest:

ERNEST W. SWIDER
Attesting Officer

DAVID L. LADD
Commissioner of Patents